June 25, 1968  R. E. EIBECK  3,390,091
DIELECTRIC GASEOUS MIXTURE OF THIAZYLTRIFLUORIDE AND SF₆
Filed Dec. 27, 1965
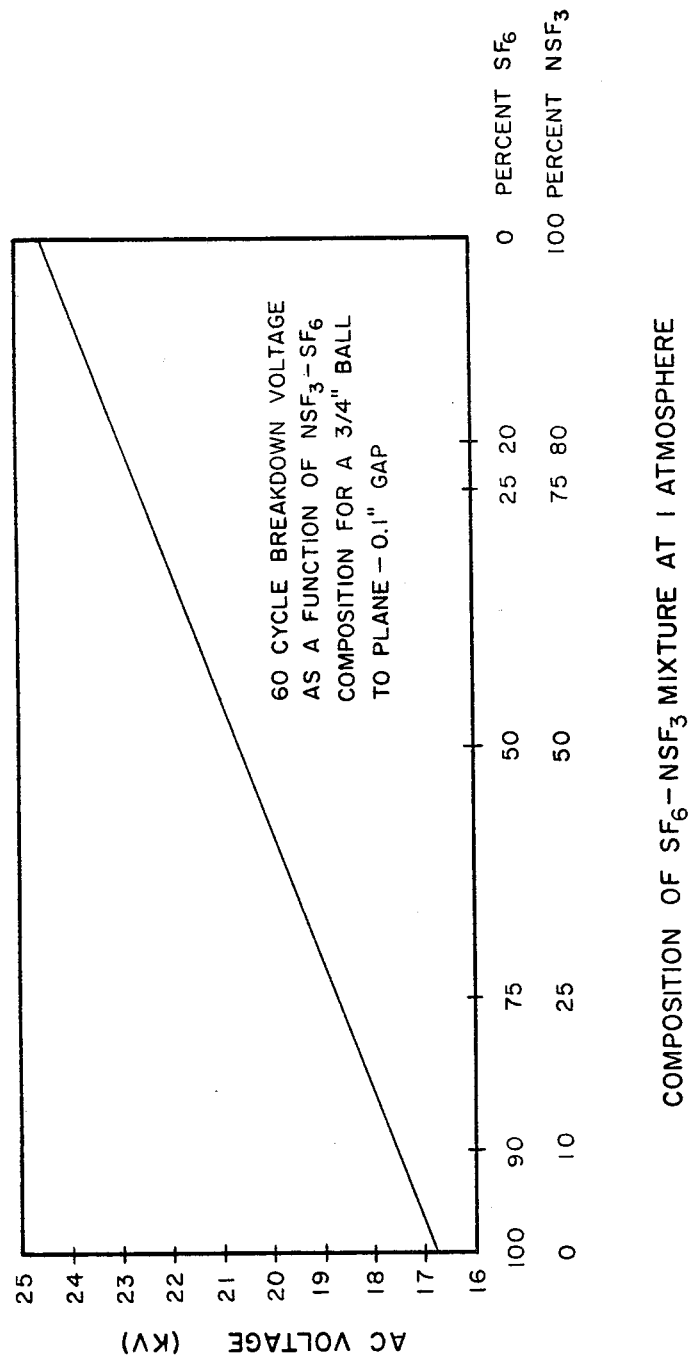
INVENTOR.
RICHARD E. EIBECK
BY
AGENT

3,390,091
DIELECTRIC GASEOUS MIXTURE OF THIAZYLTRIFLUORIDE AND SF₆

Richard E. Eibeck, Convent Station, N.J., assignor to Allied Chemical Corporation, New York, N.Y., a corporation of New York
Filed Dec. 27, 1965, Ser. No. 516,449
3 Claims. (Cl. 252—63.5)

ABSTRACT OF THE DISCLOSURE

Mixtures of thiazyltrifluoride and sulfur hexafluoride have been found to possess dielectric properties which render them useful as gaseous electrical insulating media, such mixtures being superior to pure sulfur hexafluoride. These mixtures preferably contain from about 10 to about 80% by volume of thiazyltrifluoride and correspondingly 20–90% by volume sulfur hexafluoride.

---

This invention relates to mixtures of thiazyltrifluoride and sulfur hexafluoride, useful as gaseous electrical insulating media.

It is known to use sulfur hexafluoride as a gaseous dielectric medium for sealed electrical apparatus such as, for example, dry type and vapor cooled type transformers, capacitors, switchgear, reactors, cables and other forms of electrical apparatus contained in sealed housings. However, it has been found that the electrical potentials which can be employed in electrical apparatus using sulfur hexafluoride as a dielectric medium are limited by the electrical breakdown strength of the sulfur hexafluoride, particularly when it is used in non-uniform fields, i.e., electrical fields wherein there is a non-proportional distribution of electrical potential in the space between the electrodes. Non-uniform fields exist, for example, between electrically charged, spaced surfaces having different shapes, such as a ball and a plane, or a point and a plane.

There is a need in the art for gaseous dielectric media having dielectric strength superior to sulfur hexafluoride, particularly in non-uniform field applications. Provision of dielectric media having increased dielectric strength allows charged surfaces of electrical apparatus to be spaced closer together, thus giving rise to smaller and lighter apparatus. Provision of media having increased dielectric strength also makes it unnecessary to pressurize sulfur hexafluoride to achieve an increase in dielectric strength. Elimination of the need for pressurization is greatly advantageous, due to the obvious simplification of apparatus which it makes possible.

In accordance with the present invention, it has been discovered that gaseous dielectric media comprising mixtures of thiazyltrifluoride and sulfur hexafluoride provide resistance to electrical breakdown which is superior to that of sulfur hexafluoride alone under comparable conditions. Preferably, the dielectric media of this invention comprise mixtures of 10% to 80% by volume of thiazyltrifluoride and, correspondingly, 20% to 90% by volume of sulfur hexafluoride.

Sulfur hexafluoride is a gas that solidifies directly from its gaseous state at atmospheric pressure at about −64° C. Thiazyltrifluoride, $NSF_3$, is a gas that liquefies at about −27.1° C. at atmospheric pressure. Both gases and their methods of preparation are known.

For a better understanding of the nature of this invention, reference should be made to the following detailed description and to the accompanying drawing.

Breakdown measurements were made for various thiazyltrifluoride-sulfur hexafluoride mixtures in a two-inch diameter hollow gas-tight cell having a volume of about 0.4 liter. The cell was provided with means allowing introduction gases and means for measuring internal pressure. Inside the cell were electrodes consisting of a ¾″ diameter steel ball and a 1¼″ brass disc spaced 0.1″ from each other and provided with electrical connections through the cell wall to a 60 cycle alternating current source, so as to impose a variable voltage across the electrodes. The various mixtures represented on the drawing were determined by pressure measurements. For example, to prepare a 70% $NSF_3$-30% $SF_6$ by volume mixture, the cell was evacuated of air, filled with $NSF_3$ to 3.2 cm. Hg, and $SF_6$ was added to bring the final pressure of the gaseous mixture to about 76 cm. Hg. Voltage across the electrodes was gradually increased until a spark jumped between the electrodes. The spark-over voltage was recorded as the breakdown voltage.

Referring to the drawing, there are illustrated 60 cycle breakdown voltages for different $NSF_3$-$SF_6$ mixtures at atmospheric pressure in a non-uniform field, described above.

It will be observed from the drawing that as the percent of $NSF_3$ in the $NSF_3$-$SF_6$ mixture increases, the dielectric strength of the mixture substantially increases over the strength of pure $SF_6$. The most practical range of $NSF_3$ in the mixture is between 10% and 80%. Below 10% $NSF_3$ the dielectric strength increase over pure $SF_6$ is minimal. If electrical breakdown occurs in the dielectric medium containing above 80% $NSF_3$, extensive chemical decomposition results, accompanied by emission of light and heat. Electrical breakdown occurs, for example, when there is a momentary surge in the electric potential of the electrodes of an apparatus, thus exceeding the strength of the dielectric. Such decomposition is undesirable in electrical apparatus. Decomposition upon electrical breakdown does not occur when mixtures of less than 80% $NSF_3$ are used. The optimum range of composition of the subject mixture has been found to be 25 to 75% $NSF_3$ and, correspondingly, 75 to 25% $SF_6$. This range provides the greatest increase in dielectric strength of the mixture over pure $SF_6$, as well as a margin of safety with respect to chemical decomposition of the $NSF_3$.

Since pure $NSF_3$ cannot be used due to the above-mentioned chemical decomposition, it was indeed unexpected that mixtures of $NSF_3$ and $SF_6$ could be successfully employed as dielectric media having improved dielectric strength.

If desired, the gaseous mixtures of this invention may be employed under pressure with improvements in dielectric strength, over those obtained at one atmosphere, similar in magnitude to the improvements obtained when $SF_6$ is used under pressure.

While the invention has been described with particular reference to specific embodiments, it is to be understood that it is not to be limited thereto but is to be construed broadly and restricted solely by the scope of the appended claims.

I claim:
1. A gaseous electrical insulating medium comprising a mixture of thiazyltrifluoride and sulfur hexafluoride, wherein the thiazyltrifluoride is present in an amount sufficient to increase the dielectric strength of the mixture over the dielectric strength of pure sulfur hexafluoride.

2. The gaseous electrical insulating medium of claim 1 wherein said mixture comprises 10 to 80% by volume of said thiazyltrifluoride and, correspondingly, 20 to 90% by volume of said sulfur hexafluoride.

3. The gaseous electrical insulating medium of claim 1 wherein said mixture contains 25 to 75% by volume of thiazyltrifluoride.

References Cited

FOREIGN PATENTS 640,624   5/1962   Canada.

OTHER REFERENCES

Chemical Abstracts, vol. 55, col. 24345 (1961).

LEON D. ROSDOL, *Primary Examiner.*

J. D. WALSH, *Assistant Examiner.*